US012224519B2

(12) United States Patent
Dobler

(10) Patent No.: US 12,224,519 B2
(45) Date of Patent: *Feb. 11, 2025

(54) ELECTRICAL PLUG CONNECTOR

(71) Applicant: Neutrik AG, Schaan (LI)

(72) Inventor: Oliver Dobler, Tschagguns (AT)

(73) Assignee: NEUTRIK AG, Schaan (LI)

( * ) Notice: Subject to any disclaimer, the term of this patent is extended or adjusted under 35 U.S.C. 154(b) by 398 days.

This patent is subject to a terminal disclaimer.

(21) Appl. No.: 17/640,671

(22) PCT Filed: Sep. 22, 2020

(86) PCT No.: PCT/EP2020/025426

§ 371 (c)(1),
(2) Date: Mar. 4, 2022

(87) PCT Pub. No.: WO2021/058129

PCT Pub. Date: Apr. 1, 2021

(65) Prior Publication Data

US 2022/0329002 A1 Oct. 13, 2022

(30) Foreign Application Priority Data

Sep. 24, 2019 (AT) .............................. A 50816/2019

(51) Int. Cl.
*H01R 13/52* (2006.01)
*H01R 13/74* (2006.01)
*H01R 24/64* (2011.01)

(52) U.S. Cl.
CPC ..... *H01R 13/5205* (2013.01); *H01R 13/5202* (2013.01); *H01R 13/748* (2013.01); *H01R 24/64* (2013.01)

(58) Field of Classification Search
CPC ............ H01R 13/5205; H01R 13/5202; H01R 13/748; H01R 24/64; H01R 2201/26
(Continued)

(56) References Cited

U.S. PATENT DOCUMENTS 5,249,982 A 10/1993 Funck
5,588,853 A 12/1996 Anthony
(Continued)

FOREIGN PATENT DOCUMENTS

CN 204516967 U 7/2015
CN 204615057 9/2015
(Continued)

OTHER PUBLICATIONS

International Search Report in PCT/EP2020/025426, mailed Feb. 2, 2021.

(Continued)

*Primary Examiner* — Renee S Luebke
*Assistant Examiner* — Paul D Baillargeon
(74) *Attorney, Agent, or Firm* — Volpe Koenig

(57) ABSTRACT

An electrical plug connector, in particular built-in plug connector, includes a housing with a connecting flange having through holes for feeding through fasteners; a flange plate with mounting bores for connecting to a device wall; a control panel, or similar; and a seal inserted therebetween. The outer edge of the flange plate is bent towards the housing and overlaps the outer edge of the connecting flange. The seal protrudes with a circumferential sealing lip into the insertion opening and has an edge bent towards the housing, which edge overlaps circumferential edge of the connecting flange and which, itself, is overlapped by the outer edge of the flange plate. In the assembled state, the circumferential edge of the flange plate extends at maximum to the height of the rear side of the connecting flange and the edge of the seal is higher than the rear surface of the connecting flange.

16 Claims, 10 Drawing Sheets

Figure 1:
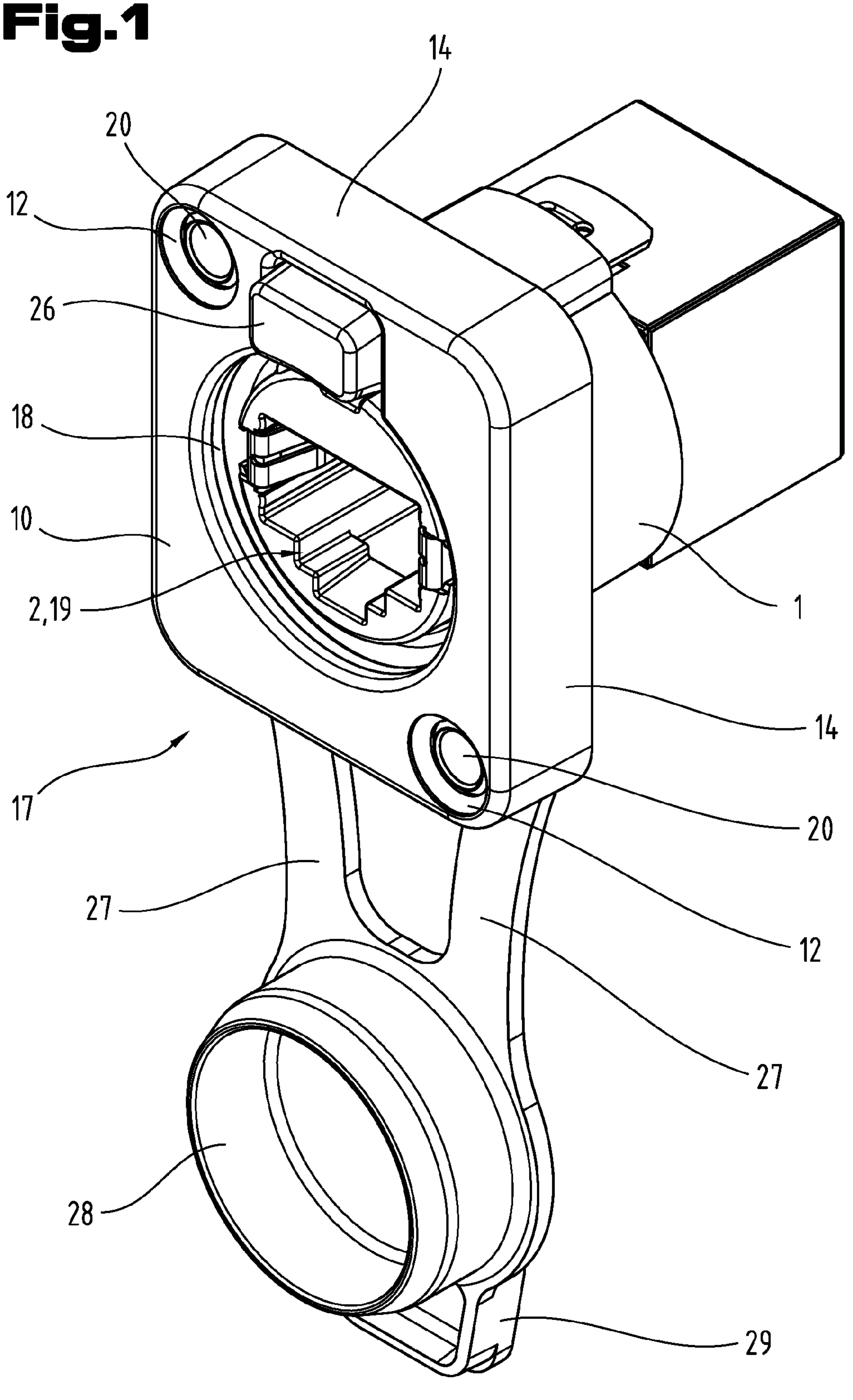

(58) Field of Classification Search
USPC .......................................................... 277/640
See application file for complete search history.

(56) References Cited

U.S. PATENT DOCUMENTS

| | | | | |
|---|---|---|---|---|
| 5,947,766 | A | 9/1999 | Tsuji et al. | |
| 6,254,428 | B1 | 7/2001 | Murakami | |
| 7,914,306 | B1 | 3/2011 | Blackwell | |
| 8,602,810 | B2 * | 12/2013 | Brunger | H01R 13/5213 439/372 |
| 9,666,975 | B1 | 5/2017 | Baldwin et al. | |
| 10,348,030 | B1 * | 7/2019 | Lin | H01R 13/64 |
| 11,165,188 | B2 | 11/2021 | Carle | |
| 2007/0141886 | A1 * | 6/2007 | Hammer | H01R 13/6392 439/266 |
| 2012/0100753 | A1 | 4/2012 | Omae | |
| 2012/0282793 | A1 | 11/2012 | Brune et al. | |
| 2015/0298624 | A1 | 10/2015 | Tyler | |
| 2017/0229804 | A1 | 8/2017 | Kurita | |
| 2021/0394626 | A1 * | 12/2021 | Genece | B60K 6/48 |
| 2022/0311175 | A1 * | 9/2022 | Dobler | H01R 13/5202 |
| 2022/0376430 | A1 | 11/2022 | Jutz | |

FOREIGN PATENT DOCUMENTS

| | | | |
|---|---|---|---|
| CN | 204615057 | U | 9/2015 |
| CN | 209150362 | U | 7/2019 |
| DE | 9105135 | | 6/1991 |
| DE | 102008047145 | B3 | 4/2010 |
| JP | H1064630 | A | 3/1998 |
| JP | 2005327561 | | 11/2005 |
| JP | 2017195041 | | 10/2017 |
| KR | 20160104928 | | 9/2016 |
| WO | 2018/220033 | A1 | 12/2018 |

OTHER PUBLICATIONS

Austrian Office Action in A 50609/2020, dated Jan. 31, 2022, with English translation of relevant parts.
International Search Report in PCT/EP2020/025428, mailed Jan. 13, 2021.

* cited by examiner

ELECTRICAL PLUG CONNECTOR

CROSS REFERENCE TO RELATED APPLICATIONS

This application is the National Stage of PCT/EP2020/025426 filed on Sep. 22, 2020, which claims priority under 35 U.S.C. § 119 of Austrian Application No. A50816/2019 filed on Sep. 24, 2019, the disclosure of which is incorporated by reference. The international application under PCT article 21 (2) was not published in English.

The invention relates to an electrical plug connector, in particular a built-in plug connector, as well as a seal for such a plug connector.

Built-in plug connectors, also referred to as chassis sockets, are installed in the housings of electrical devices, in control panels, or similar arrangements, in order to connect these devices to electric lines. These lines carry, on at least one end, a cable plug connector in a design complementary to the built-in plug connector and can be electrically connected thereto and also be locked mechanically against undesired release of the connection.

The built-in plug connector typically comprises a housing with an insertion opening for the complementary plug connector, wherein a projecting connecting flange protrudes on the insertion-side end of the housing, which connecting flange has through holes for feeding through fastening means. Moreover, a flange plate is provided on the insertion side, having an insertion opening for the complementary plug connector and having mounting bores for connecting to a device wall, a control panel, or the like.

CN 204516967 U discloses a built-in plug connector, in which an essentially flat sealing plate is inserted between the flange plate and the connecting flange on the housing and seals the connection off these two components. If a sealing of the entire built-in plug connector against a device wall, in which it is inserted, a control panel, or the like is desired, an additional seal must be provided between the built-in plug connector and the device wall. This makes the installation more complex and slower and requires an additional component.

A seal for sealing the of at least the flange plate of a built-in plug connector is known and is used, for example, in the SE8FD-TOP installation kit. This seal is designed as an essentially flat sealing plate and has a central cutout at the location of the insertion opening of the built-in plug connector. By means of the positioning between the device wall, control panel, or the like and the flange plate with the insertion opening for the complementary plug connector, an intrusion of dust, moisture, etc. into the interior of the device or the control panel is prevented. Finally, at least one fastening means, typically a screw, serves to fasten the housing, flange plate, and seal on the device wall, control panel, or the like.

An electrical plug connector, in which the outer edge of the flange plate is bent up towards the housing and overlaps the outer edge of the connecting flange, is disclosed in US 2007/0141886 A1. The seal of this plug connector has a circumferential sealing lip, which protrudes radially into the insertion opening and the seal has an edge bent up towards the housing, which edge overlaps the outer circumferential edge of the connecting flange and which itself is overlapped by the outer edge of the flange plate. In the assembled state, the circumferential edge of the flange plate extends at maximum to the height of the rear side of the flange plate of the housing, and the edge of the seal protruding towards the housing is higher than the rear surface of the connecting flange over the entire circumference of said connecting flange.

The object of the present invention was to overcome the shortcomings of the prior art and to create a built-in plug connector as comprehensively sealed as possible, which can be mounted by the end user without additional components, in a simple and swift manner with common tools.

This object is achieved by means of a device according to the invention. Further features are discussed below.

The device according to the invention is characterized in that at the locations of the mounting bores, sealing grommets are integrally formed onto the seal, which protrude upwards towards the flange plate. In the assembled state, the sealing grommets extend inside the mounting bores of the flange plate, which preferably have socket-shaped extensions in the direction towards the connecting flange of the housing. In this regard, their outer diameter preferably corresponds to the inner diameter of the mounting bores and/or of the socket-shaped extensions, wherein the sealing grommets end in the mounting bore above the lower edge of the accommodating region for the head of the fastening means. Thereby, on the one hand, a further improvement of the sealing effect can be achieved in that the intrusion of moisture, dirt, or dust via the mounting bores is prevented, while the fastening means, in particular the screw heads, still exhibit a hard stop on the flange plate, which can be noticed well.

A further optimization of the sealing effect is given if the inner diameter of the sealing grommets corresponds at a minimum to the outer diameter of the fastening means and thus, all surfaces abut one another in a sealing manner.

Preferably, the inner side of the outer edge, which is bent up towards the housing, of the flange plate is slanted outwardly, and the outer side of the circumferential edge of the seal is also slanted outwardly, preferably in a complementary manner thereto. When plugging together and/or when fastening to the device wall or the control panel by means of the provided fastening means, the edge of the seal is slightly squeezed thereby and is pressed towards the device wall or the surface of control panel, which allows achieving a particularly good sealing effect.

An alternative embodiment of a plug connector according to the invention provides that, in the assembled state, the circumferential edge of the flange plate ends before the height of the rear side of the flange plate of the housing, and a circumferential sealing edge projecting outwards covers at least a part of the thickness of the edge, which is bent up towards the housing, of the flange plate. Thereby, the shearing effect of a slanted inner side of the flange plate is avoided, and the sealing effect is effected by a force acting perpendicularly onto the edge of the seal.

According to a preferred embodiment of the invention, the plug connector is additionally characterized in that the flange plate has retaining pins protruding towards the housing, and the connecting flange has corresponding retaining bores, into which the ends of the retaining pins can be inserted. Preferably, the retaining bores are bounded by rings rising above the connecting flange, and the seal overlaps said rings with centrally open domes abutting thereon. Thereby, the flange plate and the housing are connected to the seal inserted in between them sufficiently well for preventing them from falling apart and to be able to handle the plug connector as a joint component. Moreover, in the case of retaining bores, which completely penetrate the connecting flange, the retaining pins may be provided for butting on the front side of the device housing, the connecting flange, or the like and thus, have a spacer effect, in order to limit the influence on the seal and thus prevent damage to it.

In order to ensure the sealing effect for the retaining bores, as well, preferably, the central opening of the domes has a slightly smaller diameter than the passage opening and/or the outer diameter of the retaining pins. Thus, a sealed feed-through of the retaining pins is ensured, as well as a good cohesion due to the friction between the seal and the retaining pin.

Preferably, the plug connector is designed such that the flange plate has a circumferential groove surrounding the insertion opening, in which groove a ridge is accommodated, which surrounds the sealing lip for the insertion opening radially outside and rises above the surface of the seal. In addition to the optimal centering of the seal and the flange plate relative to one another, this ridge also acts as an additional sealing ridge and thus increases the sealing effect.

In many cases of plug connections, it is desired that an inadvertent release of the connection is prevented. For this purpose, locking arrangements are present between the complementary plug connectors, which locking arrangements, however, have to be unlocked by actuating an actuating element to effect the desired release of the plug connection. Therefore, a preferred embodiment of a plug connector according to the invention provides that in the flange plate, a through hole extends radially outwards from the insertion opening, through which through hole, in the assembled state, an actuating element for a locking mechanism protrudes from the housing outwards towards the front side of the flange plate. In order to also seal this extension of the insertion opening in an optimal manner, a dome rising above the surface of the seal, radially connecting to the insertion opening extends through the through hole outwards towards the front side of the flange plate. In this regard, the actuating element is covered by the dome. For achieving the initially mentioned object, particularly a seal for an electrical plug connector, in particular a built-in plug connector, especially a plug connector according to one of the preceding paragraphs, has been devised for sealing it optimally against a device wall, control panel, or the like. This seal has a central cutout at the location of the insertion opening of the plug connector and recesses at the locations of the mounting bores for the plug connector.

According to the invention, it is particularly characterized in that sealing grommets rising above the front surface of the seal and having central feed-throughs for the fastening means are arranged at locations for feeding through fastening means. Thereby, the built-in plug connector can be mounted so as to be optimally sealed even at the locations of the fastening means.

In this regard, the sealing structure preferably comprises a circumferential sealing ridge, which enables a secure, linear sealing. In this regard, the outside of the circumferential edge of the seal is preferably slanted outwardly, so as to transform only a part of the fastening force acting perpendicularly onto the seal into contact pressure and to thereby limit the same. As an alternative embodiment, a seal is provided, in which the sealing structure is a circumferential sealing edge radially projecting outwards. Thereby, an undesired shearing effect to the outer edge of the seal can be prevented, and the sealing edge can be pressed perpendicularly on the device wall, control panel, or the like.

A further advantageous embodiment of a seal according to the invention is characterized in that domes rising above the front surface of the seal and having central feed-throughs for the spacer pins are arranged at locations for feeding through retaining pins. Such a seal is optimally suited for use in built-in plug connectors, whose flange plate and housing can be connected at least provisionally by means of cooperating retaining pins and retaining bores in these components.

For built-in plug connectors with locking arrangements and actuating elements for unlocking them, a seal, which according to the invention has a dome rising above the front surface of the seal radially connecting to the insertion opening, is optimally suited. Under said dome, the actuating element of the locking arrangement can be accommodated. In this regard, this dome is preferably formed in one piece with the seal.

The good centering of the seal against preferably the flange plate is ensured by means of a ridge rising above the front surface of the seal and surrounding the sealing lip for the insertion opening radially outside. This ridge is also an additional sealing edge and additionally improves the sealing effect.

In order to keep the built-in plug connector sealed even if the complementary plug connector is not plugged in, preferably, at least one radially protruding connecting strip is integrally formed onto the seal, on the outer end of which a sealing plug is fastened, the outer diameter of which is slightly greater than the inner diameter of the sealing lip of the insertion opening. For the sake of material savings, this sealing plug is preferably designed so as to be recessed in the shape of a pot.

Preferably, a full-surface gripping lug protrudes on the side of the sealing plug opposite the connecting strip, which significantly facilitates handling. Preferably, this gripping lug is also designed to be pot-shaped and overlaps and protects the dome in the plugged-in state of the sealing plug, which dome covers and seals the actuating element of the locking arrangement.

For the purpose of better understanding of the invention, it will be elucidated in more detail by means of the figures below.

Figure 2:
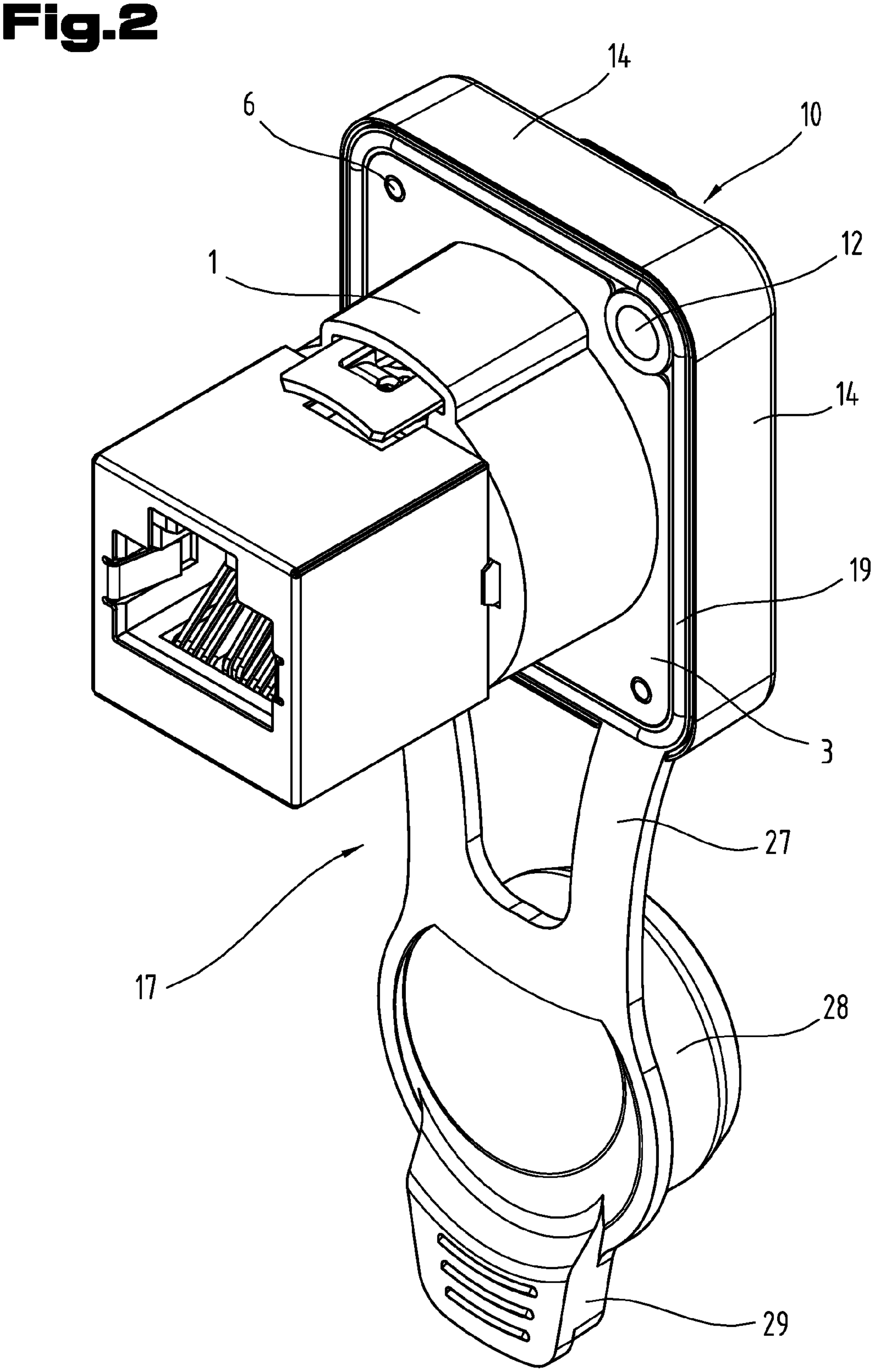
Figure 3:
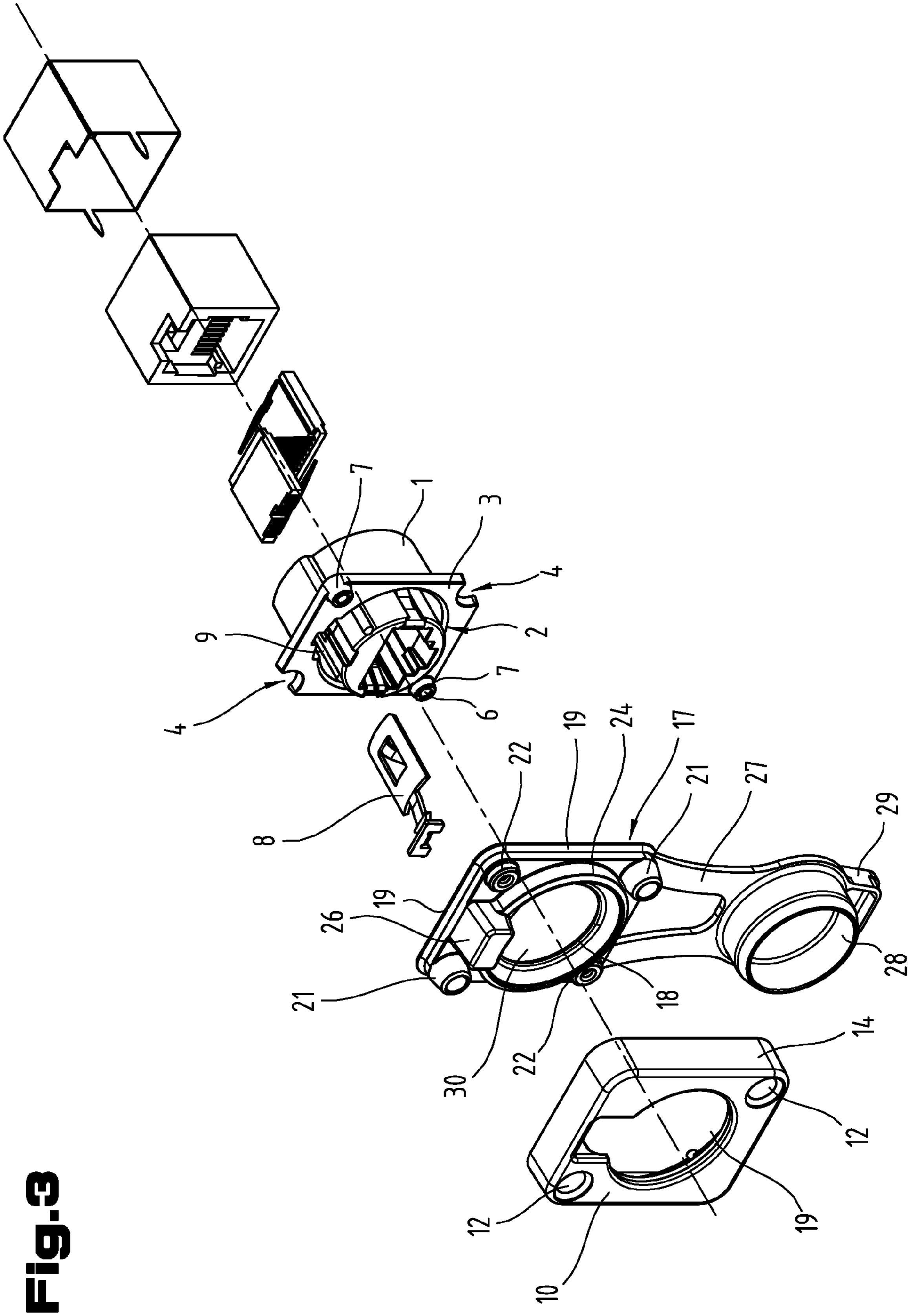
Figure 4:
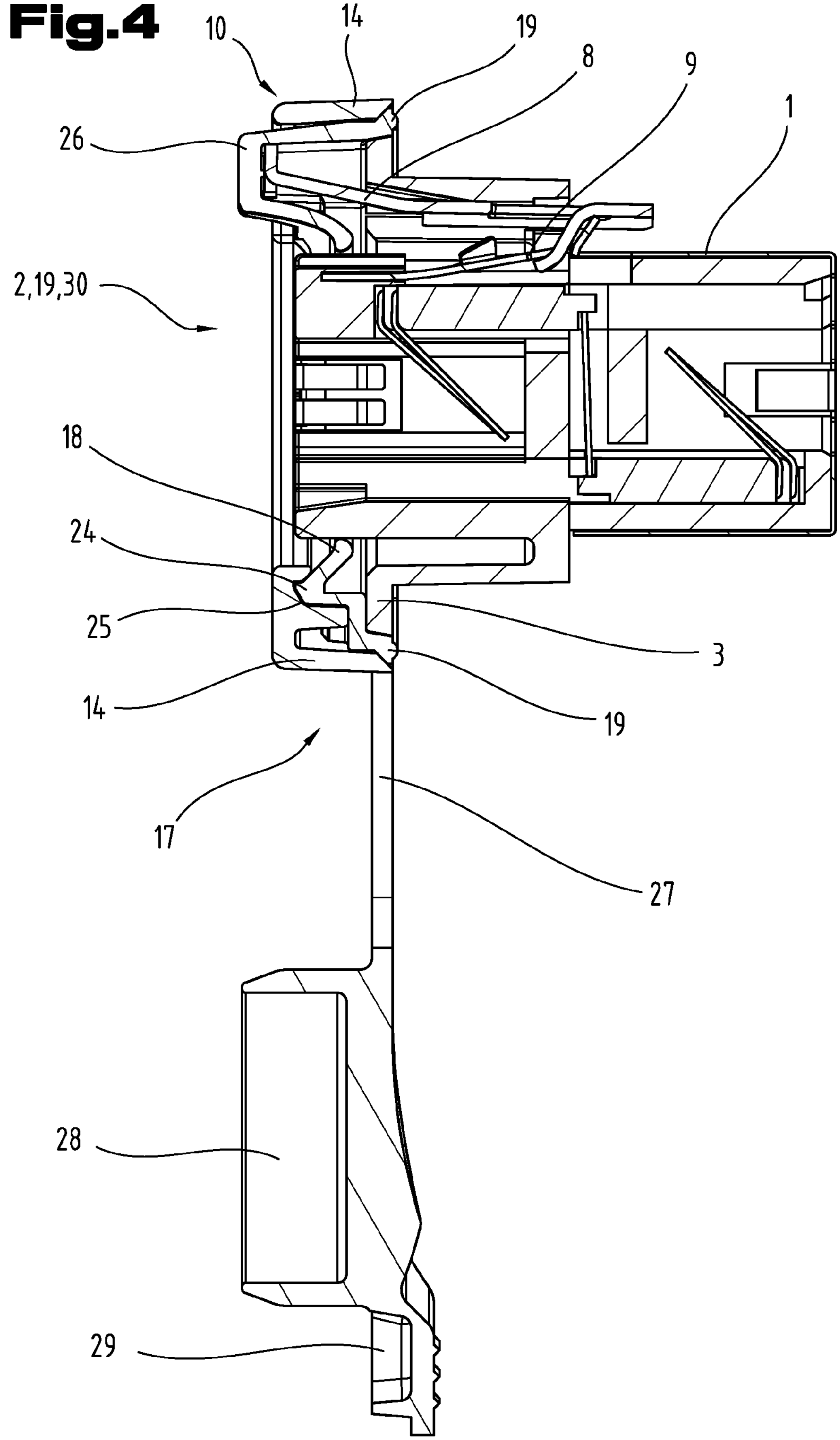
Figure 5:
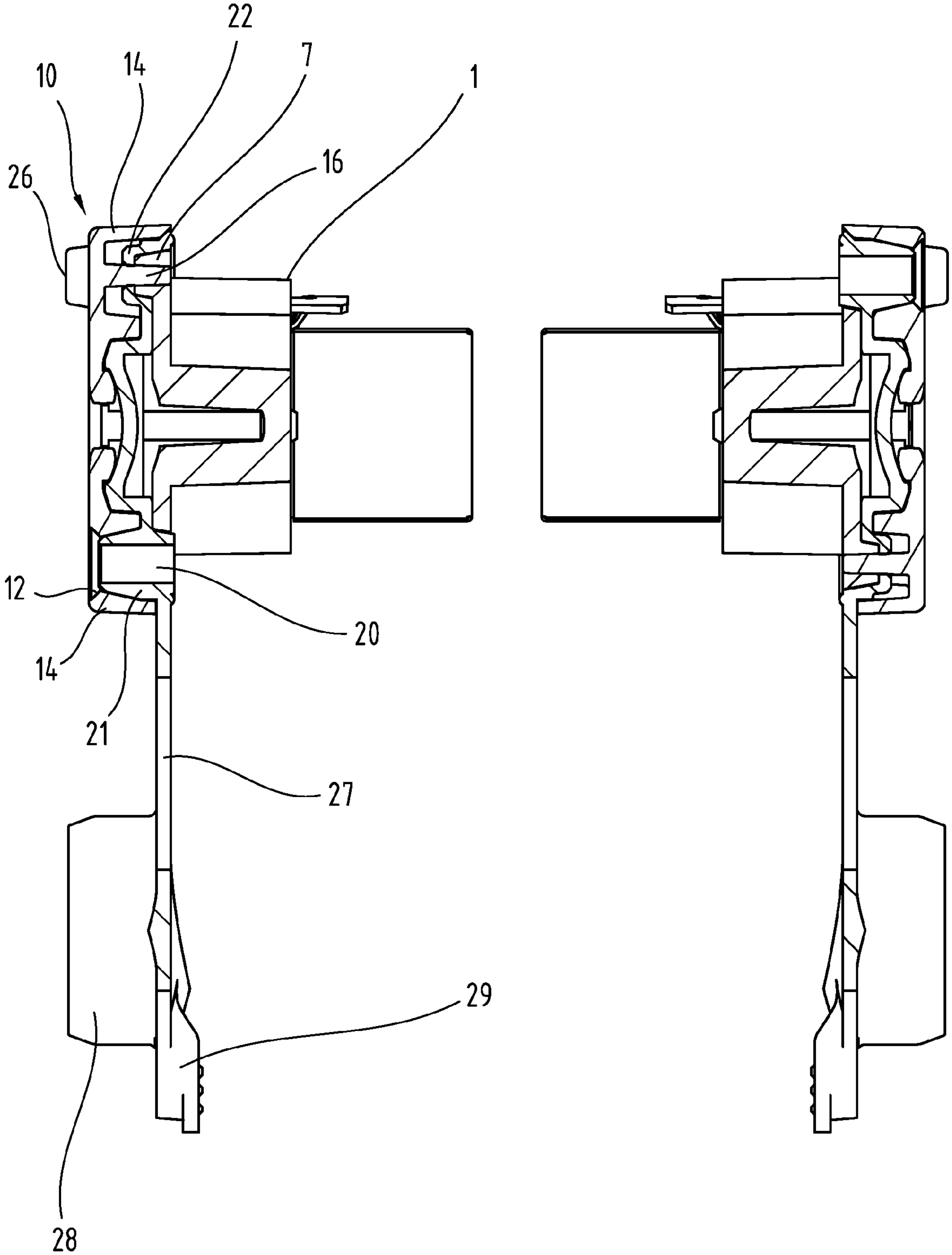
Figure 6:
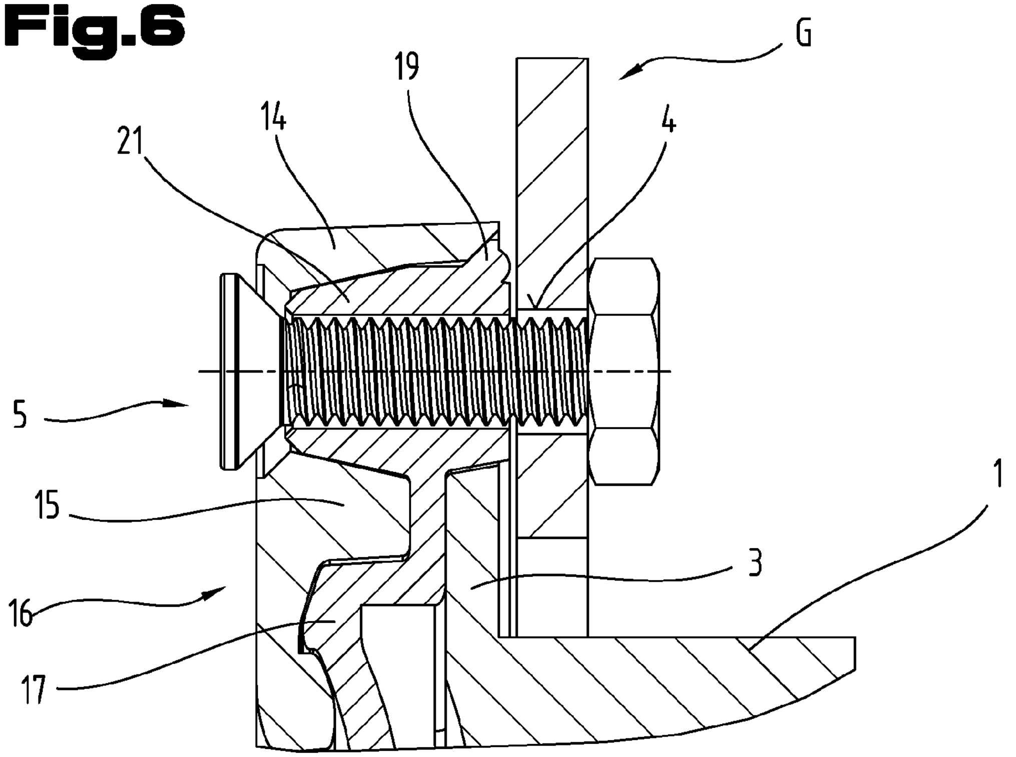
Figure 7:
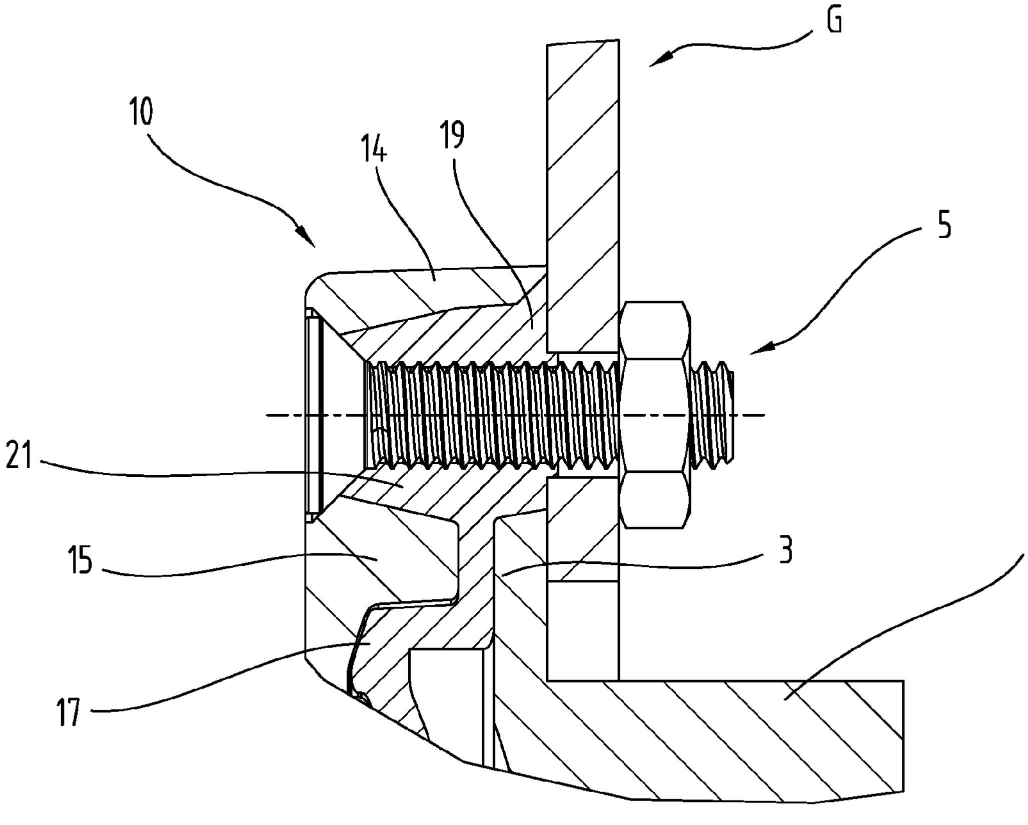
Figure 8:
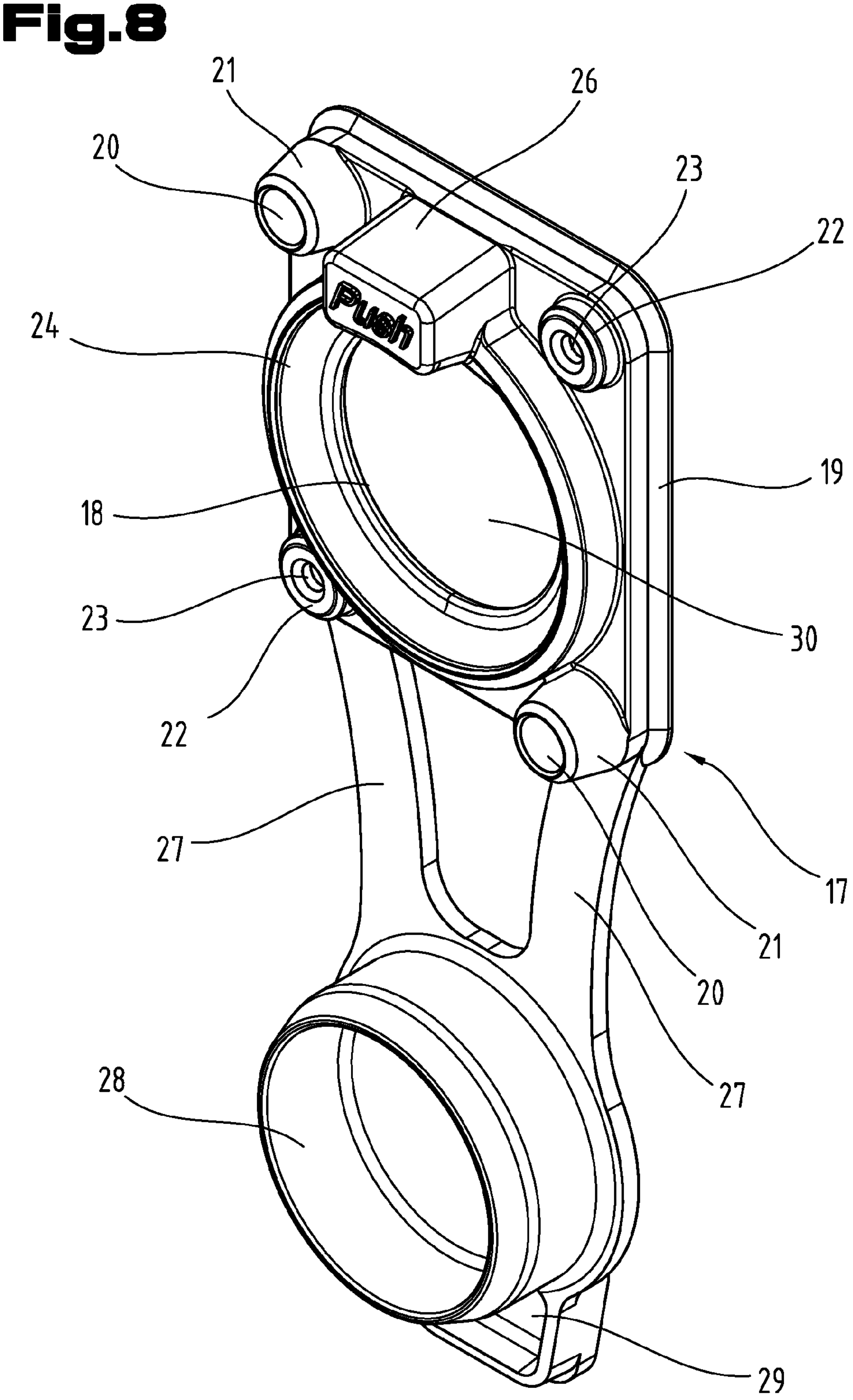
Figure 9:
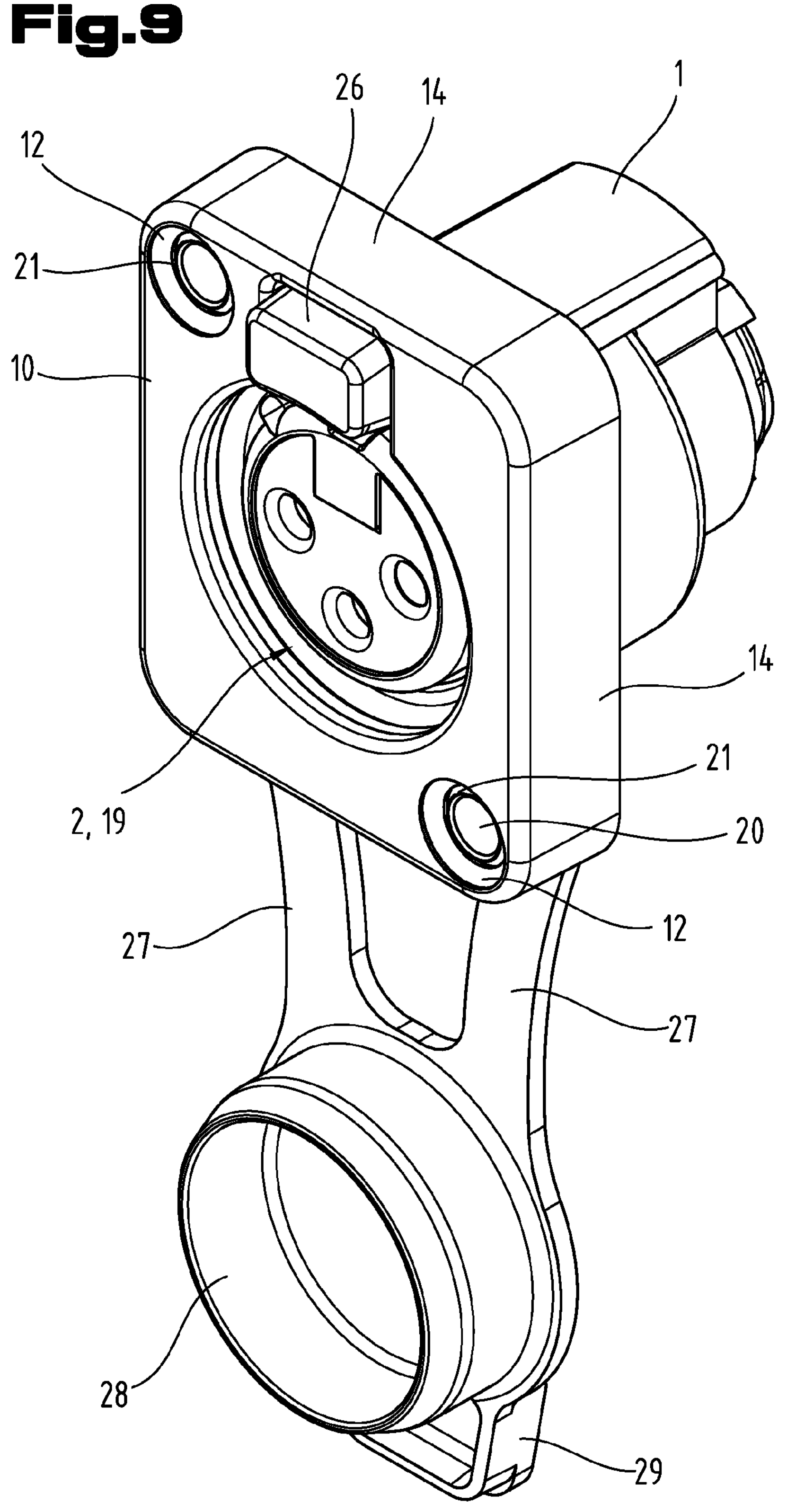
Figure 10:
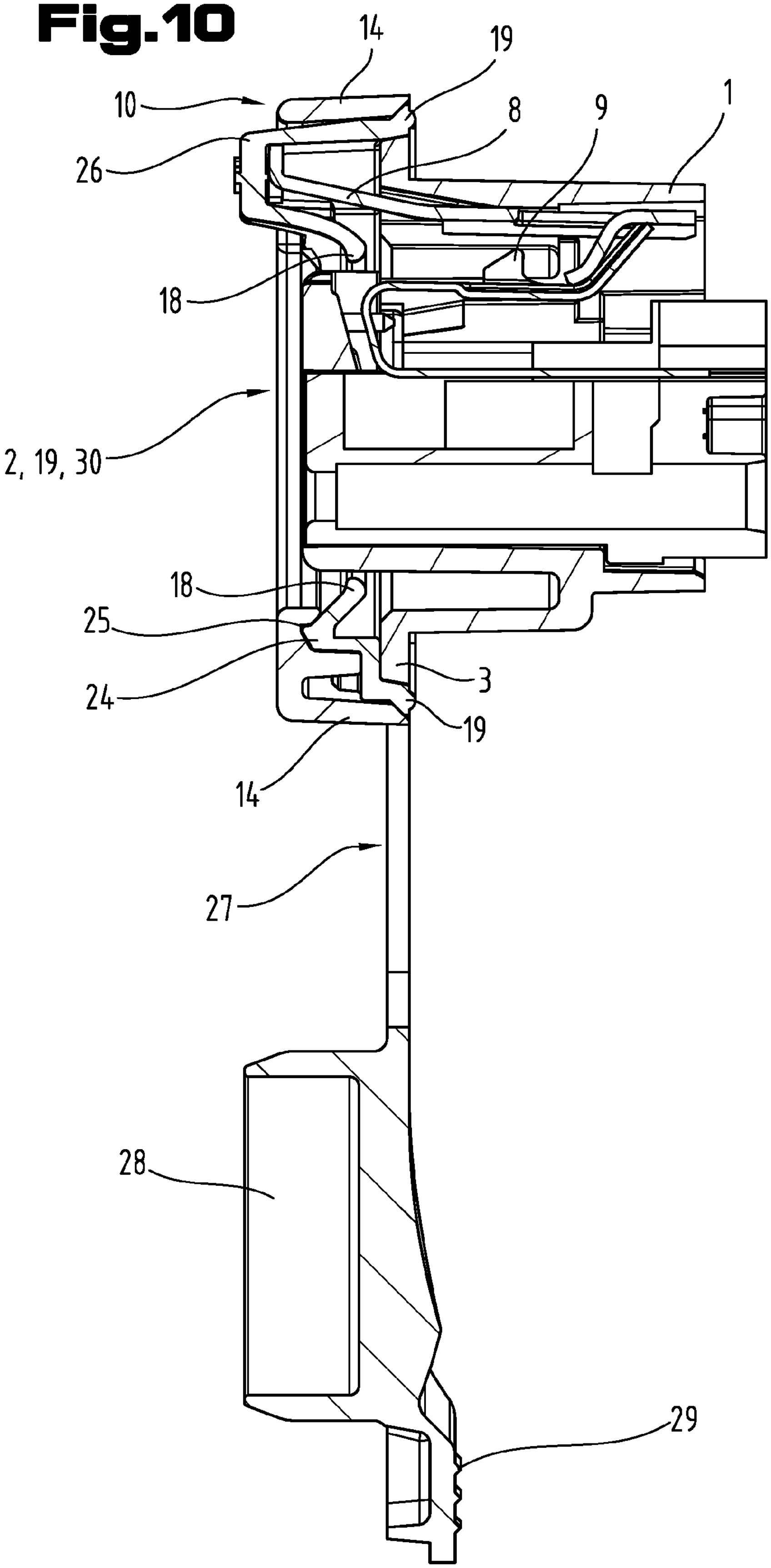
Figure 11:
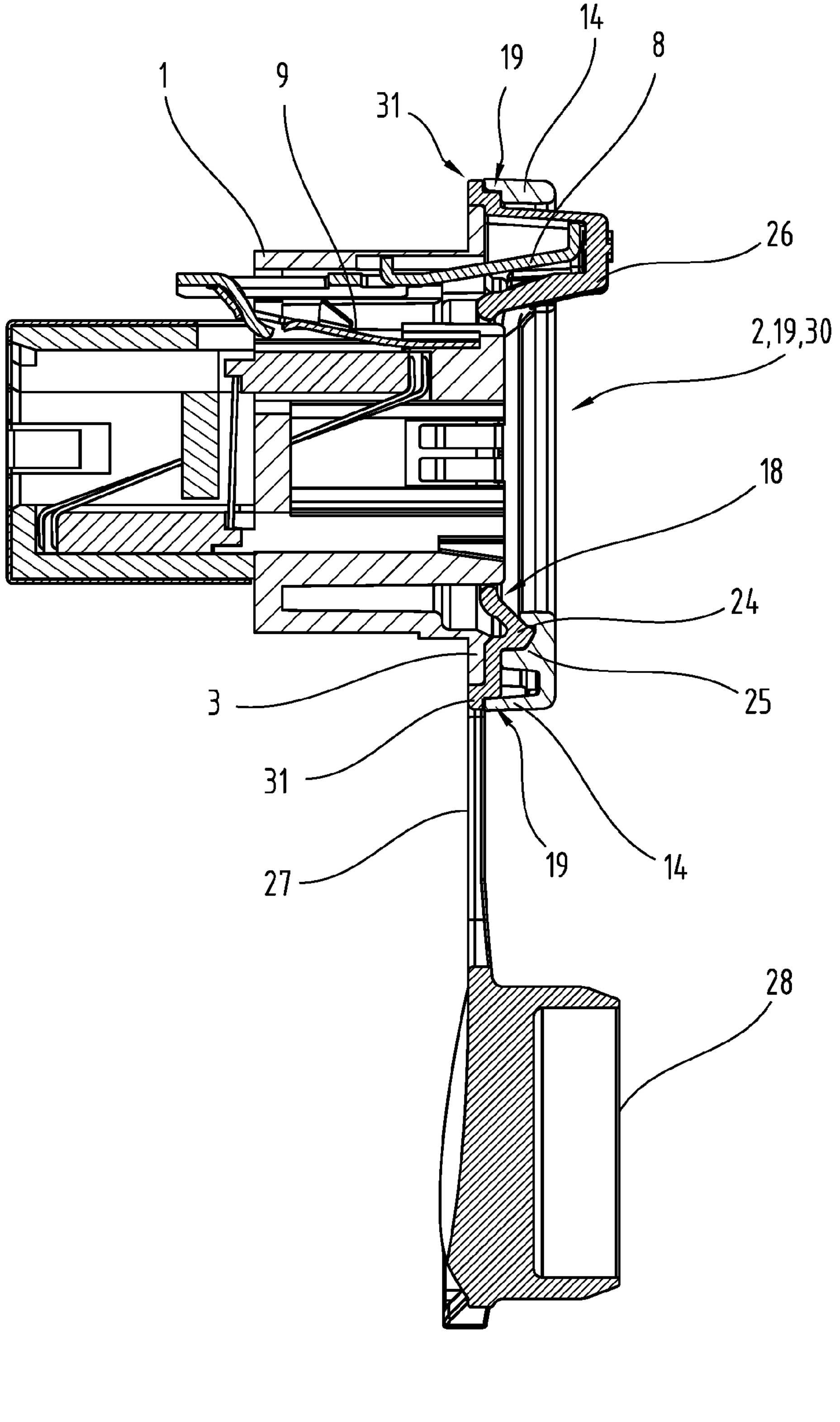

These show in a respectively very simplified schematic representation:

FIG. 1 an oblique view from the upper front of a first embodiment of a built-in plug connector according to the invention;

FIG. 2 a view rotated by 180 degrees;

FIG. 3 an exploded oblique view from the upper front;

FIG. 4 a cross-section exactly in the central plane of the built-in plug connector of FIGS. 1 to 3;

FIG. 5 a cross-section in a parallel plane, which contains the central axes of the fastening bores and of the retaining pins;

FIG. 6 a detailed cross-section in the region of the fastening bores with an inserted fastening screw;

FIG. 7 a detailed cross-section in the region of the fastening bores with an inserted and tightened fastening screw;

FIG. 8 an advantageous embodiment of a seal for a built-in plug connector to a greater scale;

FIG. 9 an oblique view from the upper front of a further embodiment of a built-in plug connector according to the invention;

FIG. 10 a cross-section exactly in the central plane of the built-in plug connector of FIG. 7; and FIG. 11 a cross-section through a further embodiment of a built-in plug connector, with a sealing edge chamfered in a stepped manner.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows by way of example a first embodiment of a built-in plug connector according to the invention in the form of a chassis socket for a data plug, in particular an RJ45 data plug, in a perspective view. Of course, the structure according to the invention can also be transferred to other types of built-in plug connector, which is explained by way of example with the further exemplary embodiment of FIGS. 9 and 10, which show an XLR chassis socket.

In the following description, equal reference numbers and/or component designations are used for equal parts. In order to avoid unnecessary repetitions, it is pointed to/reference is made to detailed description already given.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field. The electrical built-in plug connector of FIG. 1, shown in detail in an exploded view in FIG. 3, comprises a housing 1 with an insertion opening 2 for a complementary plug connector (not shown). On the insertion-side end, on the front side of the housing 1, a projecting connecting flange 3 is provided, which protrudes in a preferably orthogonal manner from the housing 1 and preferably over its entire circumference. The connecting flange 3 also has passage openings or partially open through holes 4, through which fastening means 5, typically fastening screws, rivets, or the like, for the built-in plug connector can be fed, in order to fasten it on a device wall G, a control panel, or similar elements (in this regard, see FIG. 6). The through holes 4 are preferably positioned in two corners of the connecting flange 3, which is rectangular here, opposite one another with respect to a central axis of the insertion opening 2. Of course, other silhouettes of the connecting flanges 3 are also possible, for example a circular outline, a polygonal chain, or the like. It is also possible for passage openings 4 to be present in all corners of the connecting flange 3.

At other points of the connecting flange 3, there are retaining bores 6, which are bounded by rings 7 rising above the front side of the connecting flange 3. Typically, two retaining bores 6 are positioned in two corners of the connecting flange 3 opposite one another with respect to a central axis of the insertion opening 2. In these retaining bores 6, complementary retaining elements of other components can be inserted. These retaining bores 6 are preferably provided in the center of rings 7 rising over the connecting flange 3.

Finally, in or on the housing 1, a locking arrangement 8, 9 is also positioned, the at least one locking element 9 of which may also be unlocked by means of an actuating element 8. This actuating element 8 protrudes beyond the insertion-side end of the housing 1 towards the front, so a user can reach it well.

In the assembled state of the built-in plug connector, a flange plate 10 on the insertion side is located opposite the front side of the connecting flange 3 of the housing 1. This flange plate 10 has an insertion opening 11 for the complementary plug connector in a coaxial arrangement relative to the insertion opening 2 of the housing 1. Moreover, mounting bores 12 are formed in the flange plate 10, positioned coaxially to the through holes 4 in the connecting flange 3 and designed for feeding through fastening means 5 for the built-in plug connector for connecting to a device wall, a control panel, or the like. At that location at which the actuating element 8 is arranged, a recess 13 directed radially outwards extends from the insertion opening 11, through which recess 13 the actuating element 8 can protrude towards the front side of the flange plate 10.

The outer edge 14 of the flange plate 10 is bent up towards the housing 1 and overlaps—this can be seen better in the rear view of the built-in plug connector in FIG. 2 and in the cross-section of FIG. 4—the outer edge of the connecting flange 3. On the rear side of the flange plate 10, the mounting bores 12 preferably have socket-shaped extensions 15 in the direction towards the connecting flange 3 and preferably extend up to the contact with this connecting flange 3.

At positions which correspond to the retaining bores 6 of the connecting flange 3, the flange plate 10 has retaining pins 16 protruding towards the housing 1. Their ends are designed for insertion and fixation in the retaining bores 6 of the connecting flange 3. They may possibly also be inserted into the retaining bores 6 completely and until contacting the housing wall, control panel, or the like, and act as a spacer.

A preferably plate-shaped seal 17 for sealing against the device wall G, the control panel, or the like is inserted directly between the flange plate 10 and the connecting flange 3 of the housing 1 and held clamped between said components. This seal 17 has a central cutout 30, which corresponds at least to the insertion opening 2 in size and which is arranged coaxially thereto. This central cutout 30 is bounded by a circumferential sealing lip 18, which protrudes radially into the insertion opening 2 and seals the annular gab of the insertion opening 2 when the complementary plug connector is plugged in.

The edge 19 of the seal 17 is bent up towards the housing 1 in the region of the flange plate 10 and the connecting flange 3 and overlaps the outer circumferential edge of the connecting flange 3 with said bent-up edge strip 19. On the other hand, the bent-up edge 19 of the seal 17 itself is overlapped by the bent-up outer edge 14 of the flange plate 10. The relative thicknesses of the seal 17 and connecting flange as well as the height of the outer edge 14 are selected such that, in the assembled state, the circumferential edge 14 of the flange plate 10 extends at maximum to the height of the rear side of the connecting flange 3 of the housing 1, and the edge 19 of the seal 17 protruding towards the housing 1 is higher than the rear surface of the connecting flange 3 over the entire circumference of said connecting flange 3 and is ultimately pressed against the wall of the device housing, the control panel, or the like and fulfills the sealing function when the built-in plug connector is installed.

At the location of the mounting bores 12 of the flange plate and/or the through holes 4 of the connecting flange 3, passage openings 20 are formed in the seal 17, as well.

As can be seen well in FIGS. 6 and 7, in a preferred embodiment of the invention, the inner side of the bent-up edge 14 of the flange plate 10 is designed so as to be slanted outwardly. The seal 17, as well, or rather its bent-up edge 19, is also designed to be slanted outwardly, preferably so as to complement the slanting of the flange plate 10. As shown in FIG. 7, when tightening the fastening screw 5 during mounting of the built-in plug connector, the edge 19 of the seal 17 is pressed on the device wall G, the control panel, or the like, wherein the seal, however, is preferably completely covered and protected by the flange plate 10. As an alternative thereto, a construction according to FIG. 11 could also be selected, in which, in the assembled state, the circumferential edge 14 of the flange plate 10 ends before the height of the rear side of the connecting flange 3 of the housing 1, and a circumferential sealing edge 31 projecting outwards covers at least a part of the thickness of the edge 14, which is bent up towards the housing 1, of the flange plate 10.

As is also clearly shown in FIGS. 6 to 8, according to a preferred embodiment, the seal 17 has sealing grommets 21 integrally formed onto the seal 17 at the locations of the mounting bores 12, which sealing grommets 21 protrude upwards towards the rear side of the flange plate 10. These sealing grommets 21 extend, in the assembled state, inside the mounting bores 12 of the flange plate 10, in particular also inside their socket-shaped extension 15, wherein their outer diameter preferably corresponds to the inner diameter of the mounting bores 12 and/or the extension 15. Here, the inner diameter is determined in that section, in which the shaft of the fastening means, that is preferably the threaded section of a fastening screw 5, is accommodated in the mounting bore 12.

In an unloaded state, the sealing grommets 21 end—as shown in FIG. 6—slightly above the lower edge of the accommodating region for the head of the fastening screw 5 in the mounting bore 12. After tightening the fastening screw 5, the material of the sealing grommets 21 is squeezed between the fastening screw 5, which is tightened until stop on the inner side of the mounting bore 12 of the flange plate 10, and the flange plate 10 and thereby seals the region of the screw head.

The inner diameter of the sealing grommets 21 preferably is to be greater than the outer diameter of the fastening means, in particular the fastening screws 5, wherein this outer diameter is the nominal diameter of the thread. At minimum, the inner diameter of the passage opening 20 of the sealing grommets 21 is to correspond, in the unloaded state, to the outer diameter of the fastening screws 5, as shown in FIG. 6. However, if the fastening screw 5 is tightened completely, the sealing grommet 5 is compressed, and the material of the sealing grommet 21 clings to the inner wall of the mounting bore 12 and enters between the threads of the fastening screw 5, whereby the state shown in FIG. 7 comes about. In combination with the positive locking connection in the region of the screw head, this results an optimal sealing effect across the entire height of the sealing grommet 21.

At the positions of the retaining bores 6 on the connecting flange 3, the seal 17 preferably has domes 22 rising above its surface, which domes 22, in the assembled state of the built-in plug connector, overlap the rings 7 in an abutting manner. For feeding through the retaining pins 16 of the flange plate 10, the domes 22 have central openings 23, the diameter of which is preferably slightly smaller than the diameter of the retaining bore 6 and/or of the section of the retaining pin 16 to be inserted into the retaining bore 6.

As a further structure rising above the surface of the seal 17, a ridge 24 or protuberance is present, which surrounds the sealing lip 18 for the insertion opening 2 and the central cutout 30 radially outside. In the assembled state of seal 17 and flange plate 10, this ridge 24 is received in a corresponding groove 25, which coaxially surrounds the insertion opening 11.

In the region, in which, in the assembled state, the actuating element 8 protrudes through the flange plate 10, the ridge 24 terminates in a dome 26, which also rising above the surface of the seal 17 and, in its height, even further over the height of the ridge 24. This dome 26 advantageously formed integrally with the seal 17 also protrudes beyond the front side of the flange plate 10 and allows the user to actuate the actuating element 8 and thus the release of the locking of the complementary plug connector plugged into the built-in plug connector, which plug connector is held in the insertion opening 2 of the housing 1 by the locking arrangement 9 until then.

In addition to the sealing of the insertion opening 2 by means of the sealing lip 18 of the seal 17 when the complementary plug connector is plugged in, a possibility for sealing in an unplugged state was also desired. For this purpose, at least one radially protruding connecting strip is integrally formed onto the seal 17, projecting out from under the edge region 14 of the flange plate 10 bent towards the housing 1. Preferably, — as shown in the figures—two such connecting strips 27 are integrally formed onto the seal 17 in an approximately parallel or slightly V-shaped arrangement. At the outer end of these connecting strips 27, a sealing plug 28 is fastened, the outer diameter of which corresponds at maximum to the inner diameter of the insertion openings 2, 11 and which preferably is slightly greater than the inner diameter of the sealing lip 18 of the seal 17 sealing the insertion opening 2. Preferably, the sealing plug 28 has a pot-shaped design.

For easier handling of the sealing plug 28, a full-surface gripping lug 29 protrudes on the side of the sealing plug 28 opposite the connecting strip 27. Preferably, this gripping lug 29 also has an open pot-shaped design, wherein its opening is oriented in the same direction as the dome 26 sealing the actuating element 8 and is positioned in one line with this dome 26 and the central axis of the insertion opening 2. When folding the connecting strips 27 for inserting the sealing plug 28 into the insertion opening 2, this results that the dome 26 is simultaneously covered and protected by the pot-shaped gripping lug 29.

FIG. 11 shows a cross-section through a further embodiment of a built-in plug connector, with a sealing edge chamfered in a stepped manner.

By pressing the built-in plug connector onto the housing wall, the control panel, or the like until the edge of the flange plate abuts on said wall, the edge of the seal that is higher than the connecting flange in the rear is pressed tightly onto the wall and is squeezed so as to fill the volume between the connecting flange and the edge of the flange plate. Here, the seal is located between the connecting flange and the flange plate so as to be protected against damage before, during, and after installation. The insertion opening is sealed by the circumferential sealing lip when the complementary plug is plugged in, while the sealing against the housing of the device or the control panel is ensured by the bent-up edge of the seal protected by the flange plate. The components flange plate, seal, and housing with connecting flange may be plugged together at the factory and may be used by the end user as a component that can be handled as one joint part.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

| List of reference numbers | |
|---|---|
| 1 | Housing |
| 2 | Insertion opening |
| 3 | Connecting flange |
| 4 | Through hole |
| 5 | Fastening screw |
| 6 | Retaining bore |
| 7 | Ring |
| 8 | Actuating element |
| 9 | Locking element |
| 10 | Flange plate |
| 11 | Insertion opening |
| 12 | Mounting bore |
| 13 | Recess |
| 14 | Bent-up edge |
| 15 | Socket-shaped extension |
| 16 | Retaining pin |
| 17 | Seal |
| 18 | Sealing lip |
| 19 | Bent-up edge |
| 20 | Passage opening |
| 21 | Sealing grommet |
| 22 | Dome |
| 23 | Central opening |
| 24 | Ridge |
| 25 | Groove |
| 26 | Dome |
| 27 | Connecting strip |
| 28 | Closing plug |
| 29 | Gripping lug |
| 30 | Central cutout |
| 31 | Sealing edge |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| G | Device wall |

The invention claimed is:

1. An electrical plug connector, comprising:

a housing (1) with an insertion opening (2) for a complementary plug connector, wherein a projecting connecting flange (3) protrudes on an insertion-side end of the housing (1), which connecting flange (3) has through holes (4) for feeding through a fastener (5);

an insertion-side flange plate (10) with an insertion opening (11) for the complementary plug connector and having mounting bores (12) for connecting to a device wall (G);

a control panel; and a seal (17) with a central cutout (30) in a region of the insertion opening (2), inserted between the connecting flange (3) and the flange plate (10), wherein the seal (17) with a circumferential sealing lip (18) protrudes radially into the insertion opening (2), and the fastener (5) for fastening the housing (1), the flange plate (10), and the seal (17) to the device wall (G) or the control panel;

wherein an outer edge (14) of the flange plate (10) is bent up towards the housing (1) and overlaps an outer edge of the connecting flange (3), and on a rear side, the seal (17) has an edge (19) bent up towards the housing (1), which edge (19) rises above a rear surface of the seal (17) and overlaps an outer circumferential edge of the connecting flange (3) and which, itself, is overlapped by the outer edge (14) of the flange plate (10);

wherein, in an assembled state, a circumferential edge (14) of the flange plate (10) extends at maximum to a height of the rear side of the connecting flange (3) of the housing (1), and the edge (19) of the seal (17) protruding towards the housing (1) is higher than a rear surface of the connecting flange (3) over an entire circumference of the connecting flange (3) and forms a sealing structure or is provided with a sealing structure;

wherein at locations of the mounting bores (12), sealing grommets (21) are integrally formed onto the seal (17), which protrude upwards towards the flange plate (10);

wherein, in the assembled state, the sealing grommets (21) extend inside the mounting bores (12) of the flange plate (10);

wherein an outer diameter of the sealing grommets (21) corresponds to an inner diameter of the mounting bore (12); and wherein the sealing grommets (21) end above the lower edge of an accommodating region for a head of the fastener (5) in the mounting bore (12).

2. The electrical plug connector according to claim 1, wherein an inner side of the outer edge (14), which is bent up towards the housing (1), of the flange plate (10) is slanted outwardly, and the outer side of the circumferential edge (19) of the seal (17) is also slanted outwardly, in a complementary manner thereto.

3. The electrical plug connector according to claim 1, wherein in the assembled state, the circumferential edge (14) of the flange plate (10) ends before the height of the rear side of the connecting flange (3) of the housing (1), and a circumferential sealing edge (31) projecting outwards covers at least a part of a thickness of the circumferential edge (14), which is bent up towards the housing (1), of the flange plate (10).

4. The electrical plug connector according to claim 1, wherein an inner diameter of the sealing grommets (21) corresponds at a minimum to the outer diameter of the fastener (5).

5. The electrical plug connector according to claim 1, wherein the flange plate (10) has retaining pins (16) protruding towards the housing (1);

wherein the connecting flange (3) has corresponding retaining bores (6), into which ends of the retaining pins (16) can be inserted; and wherein the retaining bores (6) extend in a center of rings (7) rising above the connecting flange (3), and the seal (17) overlaps the rings (7) with centrally open domes (22) abutting thereon.

6. The electrical plug connector according to claim 5, wherein the central opening (23) of the domes (22) has a slightly smaller diameter than the retaining bore (6) and/or the outer diameter of the retaining pins (16).

7. The electrical plug connector according to claim 1, wherein the flange plate (10) has a circumferential groove (25) surrounding the insertion opening (11), in which groove (25) a ridge (24) is accommodated, which surrounds the sealing lip (18) for the insertion opening (2) radially outside and rises above a surface of the seal (17).

8. The electrical plug connector according to claim 1, wherein in the flange plate (10), a recess (13) extends radially outwards from the insertion opening (11), through which recess (13), in the assembled state, an actuating element (8) for a locking mechanism (8, 9) protrudes from the housing (1) outwards towards a front side of the flange plate (3); and wherein a dome (26) rising above a surface of the seal (17), radially connecting to the insertion opening (11), extends through the recess (13) outwards towards the front side of the flange plate (10), and thereby, the actuating element (8) is covered by the dome (26).

9. A seal (17) for an electrical plug connector for sealing against a device wall (G), comprising:

the seal having a central cutout (30) at a location of an insertion opening (2) of the electrical plug connector and through holes (20) at locations of mounting bores (12) for the electrical plug connector;

wherein a sealing lip (18) surrounding the central cutout (30) limits an inner circumference of the central cutout, and an edge (19) bent backwards and rising above a rear surface of the seal (17) is present on a rear side of the seal (17), on which edge (19) a circumferential sealing structure is arranged or which edge (19) itself forms the sealing structure; and wherein sealing grommets (21) rising above a front surface of the seal (17) and having central feed-throughs (20) for a fastener (5) are arranged at locations for feeding through the fastener (5).

10. The seal according to claim 9, wherein the sealing structure comprises a circumferential sealing ridge, wherein an outside of the circumferential edge (19) of the seal (17) is slanted outwardly.

11. The seal according to claim 9, wherein the sealing structure is a circumferential sealing edge radially projecting outwards.

12. The seal according to claim 9, wherein domes (22) rising above the front surface of the seal (17) and having central feed-throughs (23) for spacer pins (16) are arranged at locations for feeding through spacer pins (16).

13. The seal according to claim 9, wherein a dome (26) rising above the front surface of the seal (17), radially connecting to the central cutout (30), is arranged and formed integrally with the seal (17).

14. The seal according to claim 9, wherein a ridge (24) surrounding the central cutout (30) radially outside, rising above the front surface of the seal (17), is provided.

15. The seal according to claim 9, wherein at least one radially protruding connecting strip (27) is integrally formed onto the seal (17), a pot-shaped sealing plug (28) is fastened to an outer end of the connecting strip (27), and an outer diameter of the pot-shaped sealing plug is slightly greater than an inner diameter of the sealing lip (18) of the central cutout (30).

16. The seal according to claim 15, wherein a full-surface gripping lug (29), which has a pot-shaped design, protrudes on a side of the sealing plug (28) opposite the connecting strip (27).

* * * * *